US010435075B2

(12) United States Patent
Lorenz et al.

(10) Patent No.: US 10,435,075 B2
(45) Date of Patent: Oct. 8, 2019

(54) SUSPENSION MODULE HAVING A SUBFRAME ASSEMBLY

(71) Applicants: ArvinMeritor Technology, LLC, Troy, MI (US); Nikola Motor Company LLC, Phoenix, AZ (US)

(72) Inventors: Edwin D. Lorenz, Grand Blanc, MI (US); Adam P. Sadlik, Clarkston, MI (US); Kevin M. Lynk, Salt Lake City, UT (US)

(73) Assignees: ArvinMeritor Technology, LLC, Troy, MI (US); Nikola Motor Company LLC, Phoenix, AZ (US)

( * ) Notice: Subject to any disclaimer, the term of this patent is extended or adjusted under 35 U.S.C. 154(b) by 0 days.

(21) Appl. No.: 15/498,550

(22) Filed: Apr. 27, 2017

(65) Prior Publication Data

US 2017/0320522 A1 Nov. 9, 2017

Related U.S. Application Data

(60) Provisional application No. 62/332,868, filed on May 6, 2016.

(51) Int. Cl.
*B60G 3/18* (2006.01)
*B60G 3/20* (2006.01)
(Continued)

(52) U.S. Cl.
CPC ............... *B62D 21/11* (2013.01); *B60G 3/18* (2013.01); *B60G 3/20* (2013.01); *B60G 7/008* (2013.01); *B60G 11/27* (2013.01); *B60G 2200/14* (2013.01); *B60G 2200/144* (2013.01); *B60G 2202/1524* (2013.01);
(Continued)

(58) Field of Classification Search
CPC . B62D 21/11; B60G 3/18; B60G 3/20; B60G 7/008; B60G 2200/14; B60G 2200/144; B60G 2202/1524; B60G 2204/128
See application file for complete search history.

(56) References Cited

U.S. PATENT DOCUMENTS 2,866,651 A 12/1958 Powell
2,971,772 A 2/1961 Tantlinger et al.
(Continued)

FOREIGN PATENT DOCUMENTS

BR PI0405014 A 6/2006
CN 204399316 U 6/2015
(Continued)

OTHER PUBLICATIONS

European Patent Office, Extended European search report for the corresponding European Patent Application No. 17169629.7 dated Aug. 25, 2017.
(Continued)

*Primary Examiner* — Faye M Fleming
(74) *Attorney, Agent, or Firm* — Brooks Kushman P.C.

(57) ABSTRACT

A suspension module having a subframe assembly. The subframe assembly may include a lower subframe that may pivotally support at least one lower control arm. An upper control arm mounting plate may be mounted to the lower subframe. The upper control arm mounting plate may pivotally support an upper control arm.

20 Claims, 6 Drawing Sheets

(51) Int. Cl.
  *B60G 7/00* (2006.01)
  *B60G 11/27* (2006.01)
  *B62D 21/11* (2006.01)

(52) U.S. Cl.
  CPC .............. *B60G 2204/128* (2013.01); *B60G 2204/1262* (2013.01); *B60G 2204/143* (2013.01); *B60G 2204/148* (2013.01); *B60G 2206/0114* (2013.01); *B60G 2206/60* (2013.01); *B60G 2300/02* (2013.01); *B60G 2300/07* (2013.01)

(56) References Cited

U.S. PATENT DOCUMENTS

| | | |
|---|---|---|
| 2,998,264 A | 8/1961 | Stump |
| 3,007,716 A | 11/1961 | Maharick |
| 3,477,738 A | 11/1969 | Manning |
| 4,174,855 A | 11/1979 | Vandenberg |
| 4,274,338 A | 6/1981 | Uozumi |
| 4,313,619 A | 2/1982 | Hailer |
| 4,813,704 A | 3/1989 | Smith |
| 4,974,872 A | 12/1990 | Riese |
| 5,396,968 A | 3/1995 | Hasebe et al. |
| 5,413,462 A | 5/1995 | Alberni |
| 5,879,265 A | 3/1999 | Bek |
| 5,927,417 A | 7/1999 | Brunner et al. |
| 6,290,244 B1 | 9/2001 | Hosoya |
| 6,349,782 B1 | 2/2002 | Sekiya et al. |
| 6,357,769 B1 | 3/2002 | Omundson et al. |
| 6,428,027 B1 | 8/2002 | Stuart |
| 6,840,525 B1 | 1/2005 | Griffiths |
| 6,866,295 B2 | 3/2005 | Ziech et al. |
| 6,886,647 B1 | 5/2005 | Gotta |
| 7,464,779 B2 | 12/2008 | Grabmaier et al. |
| 7,819,411 B2 | 10/2010 | Eshelman et al. |
| 7,971,890 B2 | 7/2011 | Richardson |
| 8,402,878 B2 * | 3/2013 | Schreiner ............... B60G 3/20 296/187.07 |
| 8,579,308 B2 | 11/2013 | Weeks et al. |
| 8,640,801 B2 | 2/2014 | Hennings et al. |
| 8,678,118 B2 | 3/2014 | Takenaka et al. |
| 8,960,341 B2 | 2/2015 | Weber |
| 9,221,494 B2 | 12/2015 | Hestermeyer et al. |
| 9,221,496 B2 | 12/2015 | Barr et al. |
| 9,266,423 B2 | 2/2016 | Hoshinoya et al. |
| 9,533,711 B2 * | 1/2017 | Hirsch ................... B62D 21/20 |
| D814,979 S | 4/2018 | Cantuern et al. |
| 2002/0163174 A1 | 11/2002 | Bell et al. |
| 2003/0064846 A1 | 4/2003 | Klemen et al. |
| 2003/0098564 A1 | 5/2003 | VanDenberg et al. |
| 2003/0122340 A1 | 7/2003 | Varela |
| 2004/0150142 A1 | 8/2004 | Warinner et al. |
| 2004/0183271 A1 | 9/2004 | Galazin et al. |
| 2006/0192361 A1 | 8/2006 | Anderson et al. |
| 2006/0208447 A1 | 9/2006 | Eshelman et al. |
| 2007/0259747 A1 | 11/2007 | Thomas et al. |
| 2008/0179116 A1 | 7/2008 | Ikenoya et al. |
| 2008/0315546 A1 | 12/2008 | Kucinski et al. |
| 2009/0014223 A1 | 1/2009 | Jones et al. |
| 2009/0057050 A1 | 3/2009 | Shino et al. |
| 2010/0025131 A1 | 2/2010 | Gloceri et al. |
| 2010/0038877 A1 | 2/2010 | Cortez et al. |
| 2010/0117318 A1 | 5/2010 | Grozev et al. |
| 2010/0276901 A1 | 11/2010 | Richardson et al. |
| 2011/0214947 A1 | 9/2011 | Tuomas |
| 2013/0175779 A1 | 7/2013 | Kvien et al. |
| 2014/0182954 A1 | 7/2014 | Weber |
| 2014/0327220 A1 | 11/2014 | Holt et al. |
| 2015/0266373 A1 | 9/2015 | Wang |
| 2016/0076610 A1 | 3/2016 | White et al. |
| 2017/0320365 A1 | 11/2017 | Lorenz et al. |
| 2017/0320366 A1 | 11/2017 | Milton et al. |
| 2017/0320367 A1 | 11/2017 | Milton et al. |
| 2017/0320382 A1 | 11/2017 | Milton et al. |
| 2017/0320522 A1 | 11/2017 | Lorenz et al. |
| 2018/0237070 A1 | 8/2018 | Lorenz et al. |

FOREIGN PATENT DOCUMENTS

| | | |
|---|---|---|
| DE | 3136305 A1 | 3/1983 |
| DE | 19860230 A1 | 2/2000 |
| DE | 102011084858 A1 | 4/2013 |
| DE | 212013000235 U1 | 7/2015 |
| EP | 0931684 A1 | 7/1999 |
| EP | 0742113 B1 | 10/2001 |
| EP | 1724130 A1 | 11/2006 |
| EP | 1900554 B1 | 11/2011 |
| EP | 1628854 B1 | 7/2012 |
| JP | H0664419 A | 3/1994 |
| JP | H6064419 | 3/1994 |
| WO | 0123245 A1 | 4/2001 |
| WO | 2001/51300 A1 | 7/2001 |
| WO | 2015110965 A2 | 7/2015 |
| WO | 2017196633 A1 | 11/2017 |
| WO | 2017196776 A1 | 11/2017 |
| WO | 2017196778 A1 | 11/2017 |
| WO | 20171966333 A1 | 11/2017 |

OTHER PUBLICATIONS

International Searching Authority, International Search Report and Written Opinion for International Application Serial No. PCT/US17/31056, dated Sep. 6, 2017.
International Searching Authority, International Search Report and Written Opinion for International Application Serial No. PCT/US17/31653, dated Jul. 17, 2017.
International Searching Authority, International Search Report and Written Opinion for International Application Serial No. PCT/US17/31651, dated Jul. 20, 2017.
United States Patent and Trademark Office, Amendment under 37 C.F.R §1.116 for U.S. Appl. No. 15/357,350, dated Jul. 17, 2018.
United States Patent and Trademark Office, Amendment under 37 C.F.R §1.111 for U.S. Appl. No. 15/357,350, dated Feb. 5, 2018.
United States Patent and Trademark Office, Notice of Allowance and Fees Due for U.S. Appl. No. 15/357,350, dated Jul. 27, 2018.
United States Patent and Trademark Office, Non-Final Office Action for U.S. Appl. No. 15/357,350, dated Oct. 6, 2017.
United States Patent and Trademark Office, Final Office Action for U.S. Appl. No. 15/357,350, dated Apr. 17, 2018.
United States Patent and Trademark Office, Non-Final Office Action for U.S. Appl. No. 15/366,452, dated Apr. 2, 2018.
United States Patent and Trademark Office, Non-Final Office Action for U.S. Appl. No. 15/366,472, dated Sep. 4, 2018.
United States Patent and Trademark Office, Non-Final Office Action for U.S. Appl. No. 15/366,472, dated Apr. 3, 2018.
European Patent Office, Extended European Search Report for European Application No. 17169640.4, dated Sep. 7, 2017.
Lorenz et al., Notice of Allowance for U.S. Appl. No. 15/498,557, dated Dec. 5, 2018, United States Patent and Trademark Office.
Milton et al., U.S. Appl. No. 16/195,012, filed Nov. 19, 2018, U.S. Patent and Trademark Office.
U.S. Patent and Trademark Office, Non-Final Office Action for U.S. Appl. No. 15/366,452, dated Dec. 14, 2018.
U.S. Patent and Trademark Office, Final Office Action for U.S. Appl. No. 15/366,472, dated Dec. 11, 2018.
U.S. Patent and Trademark Office, Notice of Allowance and Fees Due for U.S. Appl. No. 15/498,557, dated Dec. 5, 2018.
International Bureau, Notification Concerning Transmtital of Coy of International Preliminary Report on Patentability for International Application No. PCT/US2017/031056, dated Nov. 22, 2018.
International Bureau, Notification Concerning Transmtital of Coy of International Preliminary Report on Patentability for International Application No. PCT/US2017/031651, dated Nov. 22, 2018.
International Bureau, Notification Concerning Transmtital of Coy of International Preliminary Report on Patentability for International Application No. PCT/US2017/031653, dated Nov. 22, 2018.

(56) References Cited

OTHER PUBLICATIONS

Trevor R. Milton, Amendment Under 37 C.F.R 1.111 and Petition for Extension of Time for U.S. Appl. No. 15/366,452, filed with the U.S. Patent and Trademark Office on Oct. 1, 2018.

* cited by examiner

SUSPENSION MODULE HAVING A SUBFRAME ASSEMBLY

CROSS-REFERENCE TO RELATED APPLICATIONS

This application claims the benefit of U.S. provisional application Ser. No. 62/332,868, filed May 6, 2016, the disclosure of which is hereby incorporated in its entirety by reference herein.

TECHNICAL FIELD

This disclosure relates to a suspension module having a subframe assembly.

BACKGROUND

A suspension module is disclosed in U.S. Pat. No. 8,579,308.

SUMMARY

In at least one embodiment, a suspension module is provided. The suspension module may include a subframe assembly. The subframe assembly may include a lower subframe, first and second upper control arm mounting plates, first and second side plates, and a cross beam. The lower subframe may pivotally support a lower control arm. The first and second upper control arm mounting plates may pivotally support first and second upper control arms, respectively. The first and second upper control arm mounting plates may be mounted to the lower subframe. The first and second side plates may be mounted to the first and second upper control arm mounting plates, respectively. The cross beam may extend from the first side plate to the second side plate.

In at least one embodiment, a suspension module is provided. The suspension module may include a subframe assembly. The subframe assembly may include a lower subframe that may pivotally support a lower control arm. The lower subframe may include a skid plate, a set of subframe blocks, and a first upper control arm mounting plate. The set of subframe blocks may be fixedly mounted to the skid plate and may pivotally support a lower control arm. The first upper control arm mounting plate may extend between and may connect members of the set of subframe blocks. An upper control arm may be pivotally mounted to the upper control arm mounting plate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
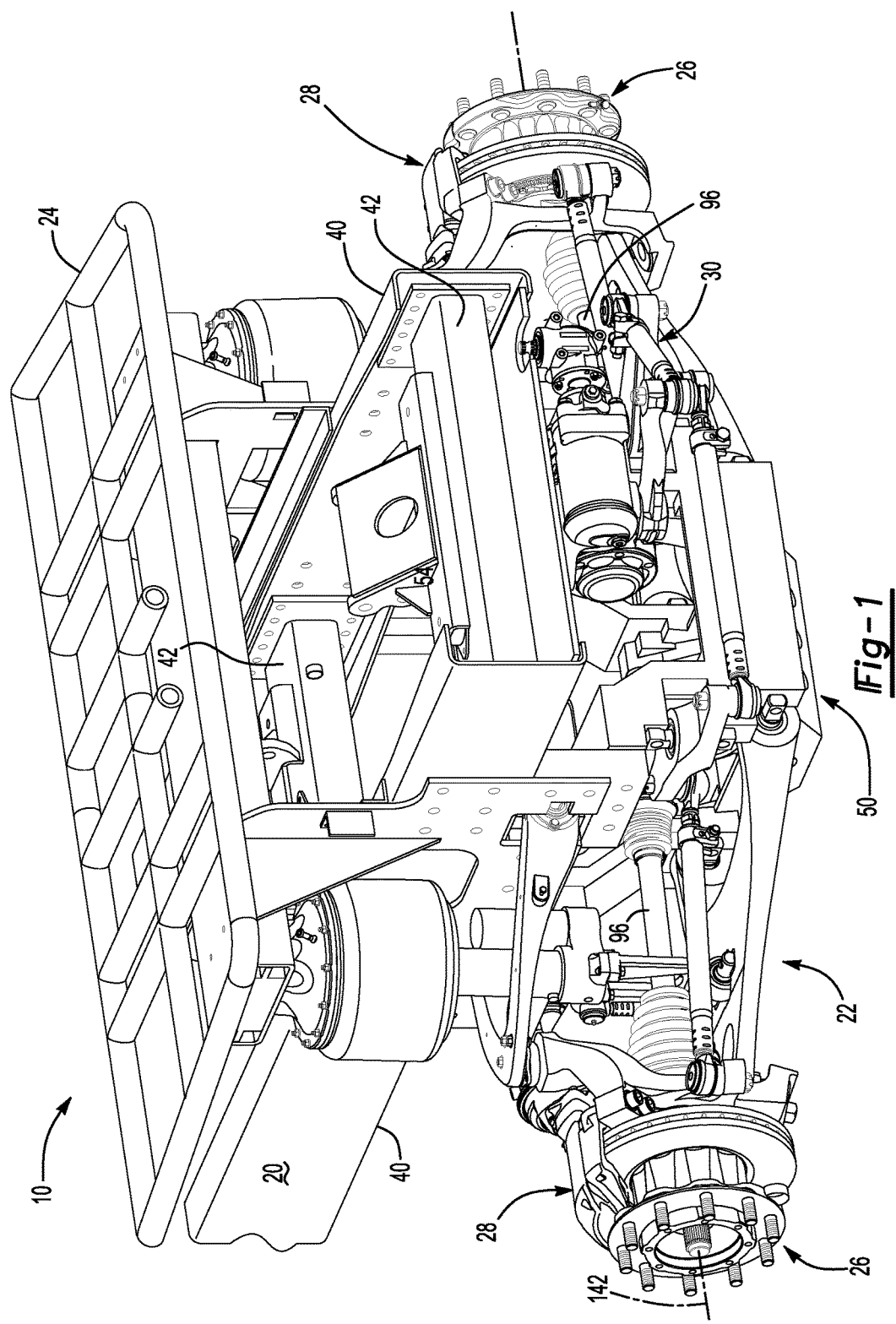
FIG. 1 is a perspective view of a portion of a vehicle having a suspension module.

Referring to FIG. 1, portion of a vehicle 10 is shown. The vehicle 10 may be a motor vehicle like a truck, bus, farm equipment, military transport or weaponry vehicle, or cargo loading equipment for land, air, or marine vessels. The vehicle 10 may include a chassis 20, a suspension module 22, a cabin frame 24, a wheel end assembly 26, a brake subsystem 28, a steering sub system 30.

The chassis 20 may help provide the structure of the vehicle 10. The chassis 20 may include frame rails 40 and cross rails 42. The frame rails 40 may extend longitudinally or in a direction that may extend between the front and rear of the vehicle 10. The cross rails 42 may extend laterally between the frame rails 40 and may be fixedly attached to the frame rails 40. The chassis 20 may support components of the vehicle 10 and may facilitate mounting of the suspension module 22 to the vehicle 10.

Figure 2:
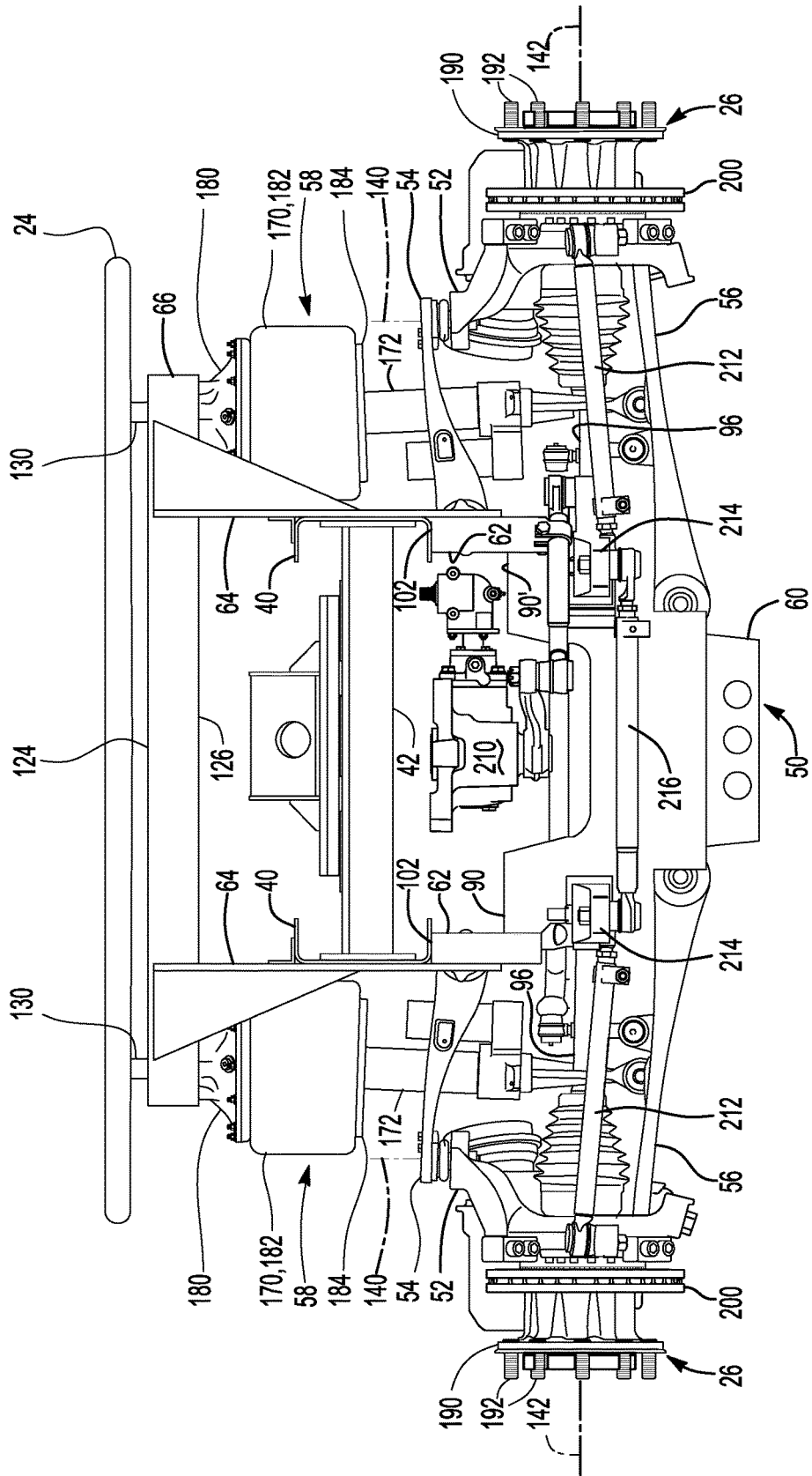
FIG. 2 is a front side view of FIG. 1.

Referring to FIGS. 1 and 2, the suspension module 22 may connect the cabin frame 24 and one or more wheel end assemblies 26 to the chassis 20. In addition, the suspension module 22 may dampen vibrations associated with vehicle travel, provide a desired level of ride quality, control vehicle ride height, or combinations thereof. The suspension module 22 may be an independent suspension system that may allow wheels to move up and down independently with respect to each other or without influence from another wheel. In at least one configuration, the suspension module 22 may include a subframe assembly 50, one or more knuckles 52, one or more upper control arms 54, one or more lower control arms 56, and one or more dampeners 58.

Figure 4:
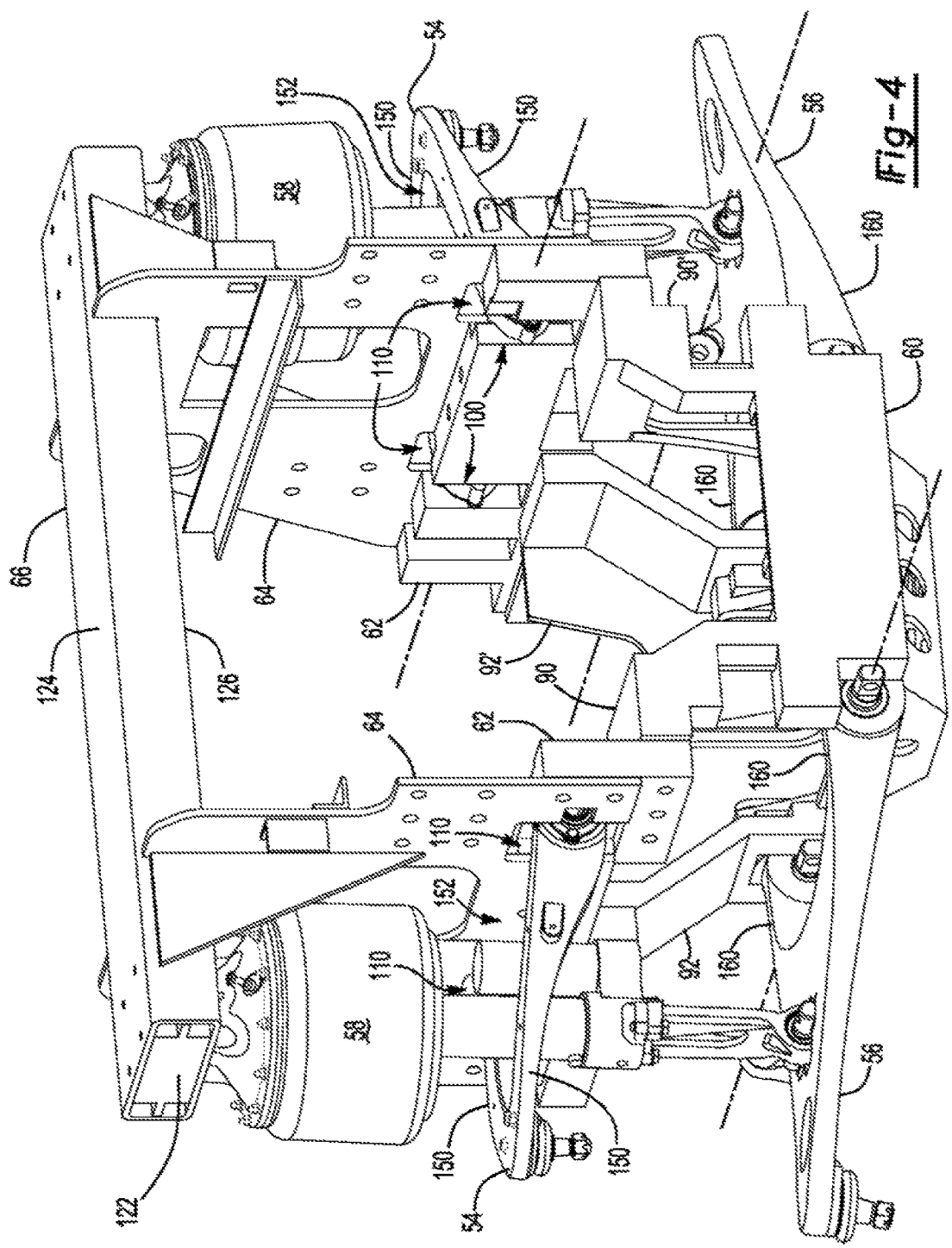
FIG. 4 is a perspective view of a portion of the suspension module.
Figure 5:
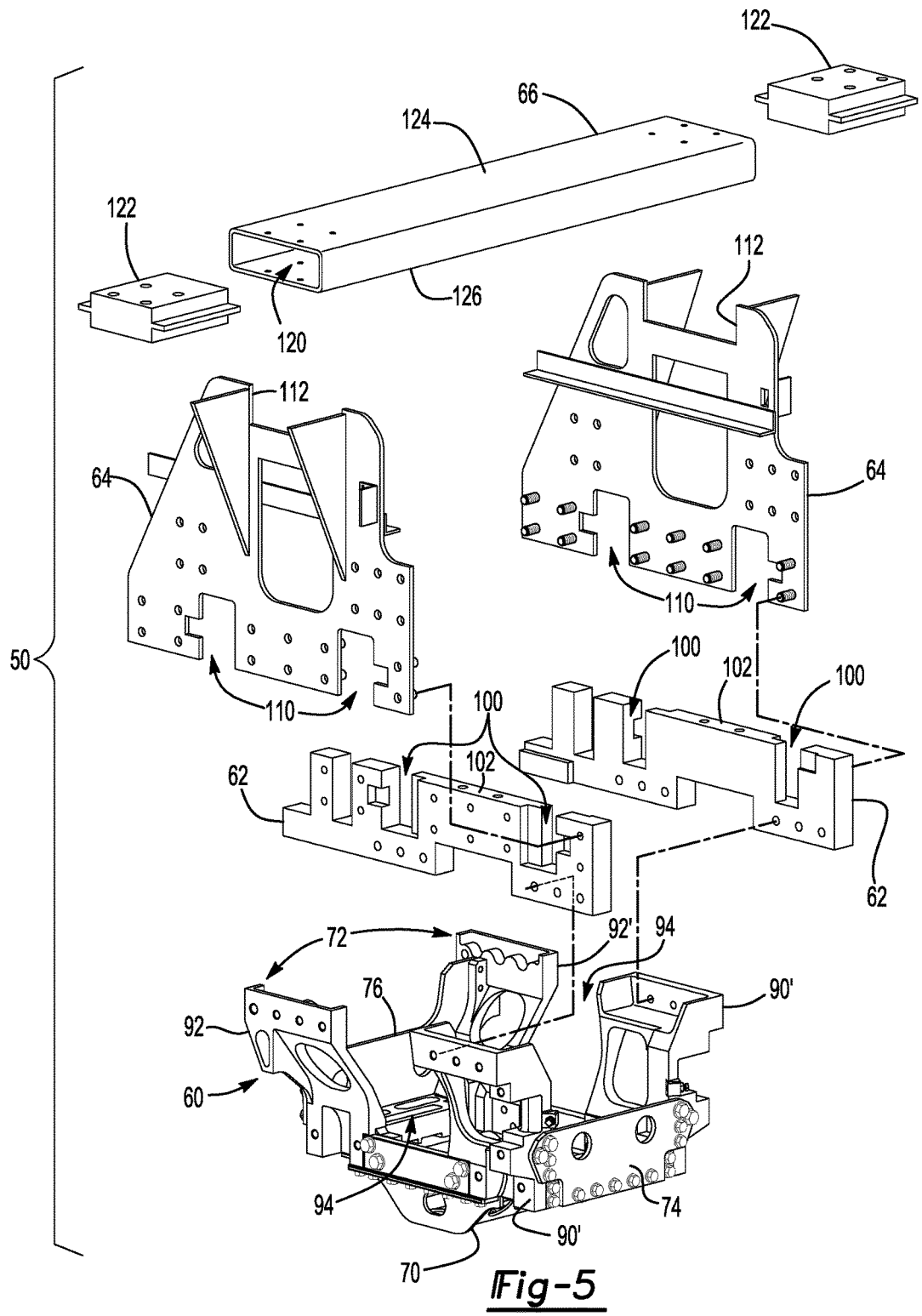
FIG. 5 is an exploded view of a subframe assembly of the suspension module.

Referring to FIGS. 1, 4 and 5, the subframe assembly 50 may be fixedly positioned with respect to the chassis 20. In at least one configuration, the subframe assembly 50 may include a lower subframe 60, one or more upper control arm mounting plates 62, one or more side plates 64, and a cross beam 66.

Figure 6:
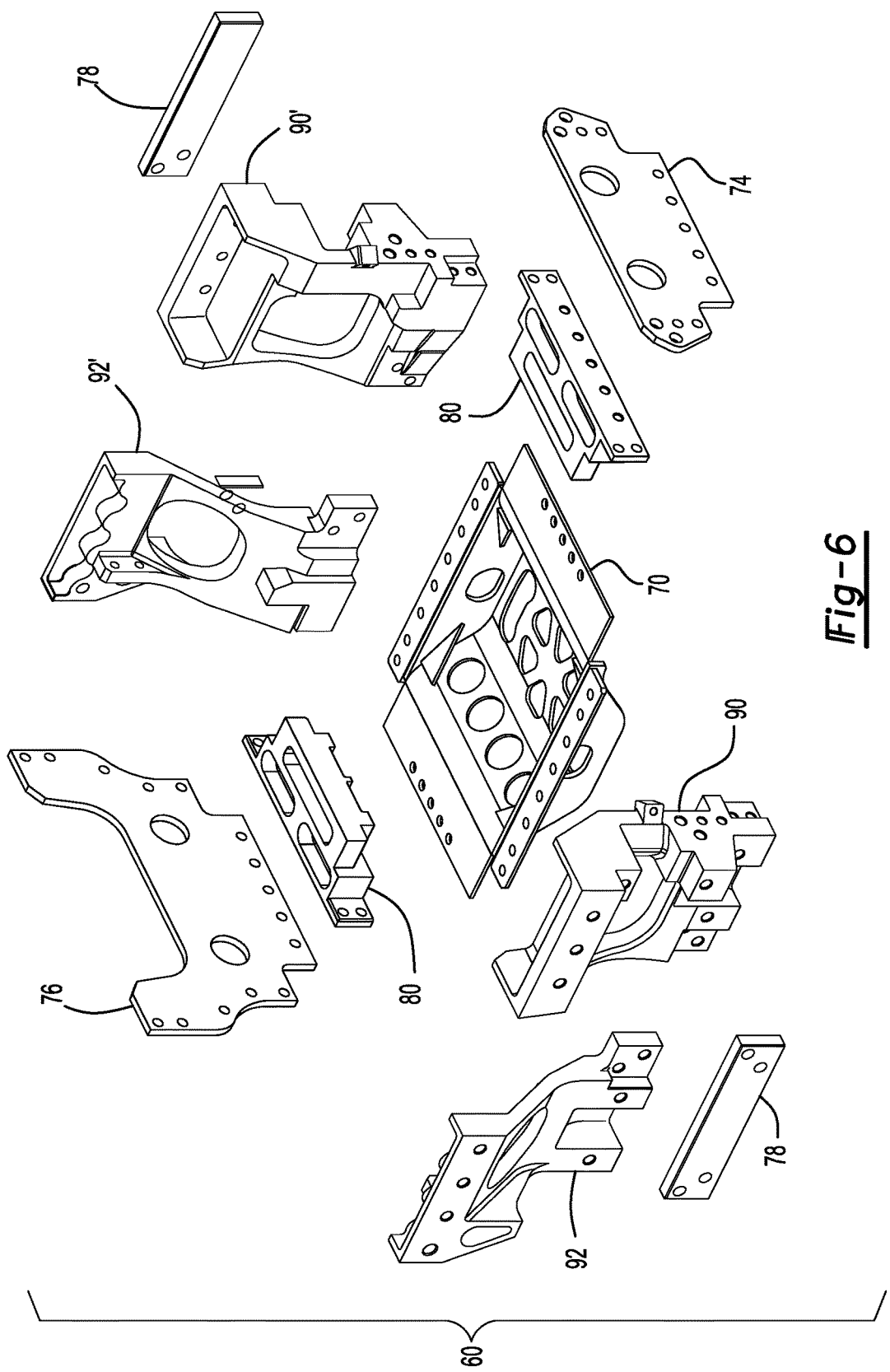
FIG. 6 is an exploded view of a lower subframe of the subframe assembly.

Referring to FIGS. 5 and 6, the lower subframe 60 may be disposed proximate the bottom of the subframe assembly 50. The lower subframe 60 may include a plurality of separate components that may be fastened together. For example, the lower subframe 60 may include a skid plate 70, a set of subframe blocks 72, a front plate 74, a rear plate 76, one or more side braces 78, and one or more subframe cross members 80.

The skid plate 70 may be disposed at the bottom of the lower subframe 60. The skid plate 70 may be provided to prevent impact damage to components that may be received in the suspension module 22, such as a motor, gearbox, or differential.

The set of subframe blocks 72 may be fixedly mounted to the skid plate 70 and to the upper control arm mounting plates 62. For example, each subframe block 72 may be attached to the skid plate 70 and a corresponding upper control arm mounting plate 62 in any suitable manner, such as with fasteners like bolts, rivets, and/or dowels, by welding, or combinations thereof. Each subframe block 72 may extend in an upward direction from the skid plate 70 to a corresponding upper control arm mounting plate 62. One or more subframe blocks 72 may pivotally support a corresponding lower control arm 56 as will be discussed in more detail below.

The members of the set of subframe blocks 72 may be cast or forged components that may have predetermined configurations. These predetermined configurations may be organized as subsets of the set of subframe blocks 72. In the configuration shown, two subframe block subsets are provided. The first subframe block subset may facilitate mounting of the steering subsystem 30 to the subframe assembly 50. For brevity, members of the first subframe block subset may be referred to as first subframe blocks. The second subframe block subset may not facilitate mounting of the steering subsystem 30. Members of the second subframe block subset may be referred to as second subframe blocks. The first subframe blocks may have different configurations than the second subframe blocks.

In FIG. 6, two first subframe blocks 90, 90' are shown. The first subframe blocks 90, 90' may extend from the skid plate 70 to a corresponding upper control arm mounting plate 62. The first subframe blocks 90, 90' may be fixedly attached adjacent to opposite lateral sides of the skid plate 70, with first subframe block 90 being illustrated on the left lateral side of the skid plate 70 and first subframe block 90' being illustrated on the right lateral side of the skid plate 70 from the perspective shown. The first subframe blocks 90, 90' may have the same configuration or may be mirror images of each other. Moreover, the first subframe blocks 90, 90' may be disposed directly opposite each other and may be mounted on top of the skid plate 70 at opposite lateral sides of the skid plate 70 in one or more embodiments. Each first subframe block 90, 90' may facilitate mounting of a corresponding lower control arm 56 and a linkage arrangement of the steering sub system 30.

Two second subframe blocks 92, 92' are also illustrated in FIG. 6. The second subframe blocks 92, 92' may extend from the skid plate 70 to a corresponding upper control arm mounting plate 62. The second subframe blocks 92, 92' may be fixedly attached adjacent to opposite lateral sides of the skid plate 70, with the second subframe block 92 being illustrated on the left lateral side of the skid plate 70 and second subframe block 92' being illustrated at the right lateral side of the skid plate 70 from the perspective shown. The second subframe blocks 92, 92' may have the same configuration or may be mirror images of each other and may be mounted on top of the skid plate 70 at opposite lateral sides of the skid plate 70 in one or more embodiments. Moreover, the second subframe blocks 92, 92' may be disposed directly opposite each other in one or more embodiments. Each second subframe block 92, 92' may facilitate mounting of a corresponding lower control arm 56, but may not facilitate mounting of the steering subsystem 30. The second subframe blocks 92, 92' may be disposed rearward from the first subframe blocks 90, 90' in one or more configurations.

The first subframe blocks 90, 90' may be spaced apart from and may not engage the second subframe blocks 92, 92'. As such, an opening 94, which is best shown in FIG. 5, may be provided between first and second subframe blocks 90, 92 and between first and second subframe blocks 90', 92'. Referring to FIGS. 1 and 2, a shaft 96, such as an axle or half shaft, may extend through the opening 94 to provide torque to an associated wheel end assembly 26.

The set of subframe blocks 72 may facilitate the construction of different suspension module configurations. For instance, a suspension module bay be constructed using one or more subframe block subsets. For instance, a suspension module that supports the steering subsystem 30 may incorporate at least one first subframe block 90, 90' and one or more second subframe blocks 92, 92'. A suspension module that does not support the steering subsystem 30 may not include any first subframe blocks 90, 90' but may include one or more second subframe blocks 92, 92'. As such, standardized subframe block configurations may be employed to construct different suspension module configurations, which may reduce associated tooling and manufacturing costs.

Referring to FIG. 6, the front plate 74 may be disposed near or at the front of the lower subframe 60. The front plate 74 may extend laterally across the lower subframe 60. For example, the front plate 74 may extend between subframe blocks that are disposed on opposite lateral sides of the skid plate 70. In the configuration shown in FIG. 6, the front plate 74 extends in a lateral direction from first subframe block 90 to first subframe block 90'. In addition, the front plate 74 may extend upward from the skid plate 70 toward the upper control arm mounting plates 62. The front plate 74 may be fixedly coupled to the skid plate 70 and the subframe blocks 72, such as the first subframe blocks 90, 90', in any suitable manner, such as with fasteners like bolts, rivets, and/or dowels, by welding, or combinations thereof. In at least one configuration, the front plate 74 may be a substantially planar metal plate.

The rear plate 76 may be disposed opposite the front plate 74. As such, the rear plate 76 may be disposed near or at the rear of the lower subframe 60. The rear plate 76 may extend laterally across the lower subframe 60. For example, the rear plate 76 may extend between subframe blocks that are disposed on opposite lateral sides of the skid plate 70. In the configuration shown in FIG. 6, the rear plate 76 extends in a lateral direction from second subframe block 92 to the second subframe block 92'. In addition, the rear plate 76 may extend upward from the skid plate 70 toward or to the upper control arm mounting plates 62. The rear plate 76 may be fixedly coupled to the skid plate 70, subframe blocks 72, such as the second subframe blocks 92, 92', and optionally the upper control arm mounting plates 62 in any suitable manner, such as with fasteners like bolts, rivets, and/or dowels, by welding, or combinations thereof. In at least one configuration, the rear plate 76 may be a substantially planar metal plate.

One or more side braces 78 may extend between the subframe blocks 72. For example, a first side brace 78 may extend longitudinally between first subframe block 90 and second subframe block 92 while another side brace 78 may extend longitudinally between first subframe block 90' and second subframe block 92'. The side braces 78 may extend upwardly from the skid plate 70 toward the upper control arm mounting plates 62. As such, the side braces 78 may partially define a corresponding opening 94. The side braces 78 may be fixedly coupled to the skid plate 70 and the subframe blocks 72 in any suitable manner, such as with fasteners like bolts, rivets, and/or dowels, by welding, or combinations thereof. In at least one configuration, the side braces 78 may be substantially planar metal plates.

One or more subframe cross members 80 may extend laterally across the lower subframe 60 to reinforce the subframe assembly 50. In the configuration shown, two subframe cross members 80 are provided that are longitudinally positioned between the front plate 74 and the rear plate 76. For example, one subframe cross member 80 may be disposed adjacent to the front plate 74 and may extend between subframe blocks 72 that are disposed at opposite lateral sides of the skid plate 70, such as first subframe blocks 90, 90'. Another subframe cross member 80 may be disposed adjacent to the rear plate 76 and may extend between other subframe blocks 72 that are disposed at opposite lateral sides of the skid plate 70, such as second subframe blocks 92, 92'. The subframe cross members 80 may be fixedly coupled to the skid plate 70, the subframe blocks, a plate like the front plate 74 or the rear plate 76, or combinations thereof, in any suitable manner, such as with fasteners like bolts, rivets, and/or dowels, by welding, or combinations thereof.

Referring to FIG. 5, one or more upper control arm mounting plates 62 may be mounted to the lower subframe 60. For example, a first upper control arm mounting plate 62 may be disposed at or near a top of the lower subframe 60 and may extend longitudinally between one or more subframe blocks 72, such as first subframe block 90 and second subframe block 92. A second upper control arm mounting plate 62 may be disposed opposite the first upper control arm mounting plate 62 and may be disposed at or near the top of the lower subframe 60 and may extend longitudinally between one or more subframe blocks 72, such as first subframe block 90' and second subframe block 92'. As such, the upper control arm mounting plates 62 may partially define a corresponding opening 94. The upper control arm mounting plates 62 may be disposed on a lateral outboard side of the subframe blocks 72 and may be fixedly coupled to the subframe blocks 72 in any suitable manner, such as with fasteners like bolts, rivets, and/or dowels, by welding, or combinations thereof. In at least one configuration, the upper control arm mounting plate 62 may be a substantially planar metal plate.

Figure 3:
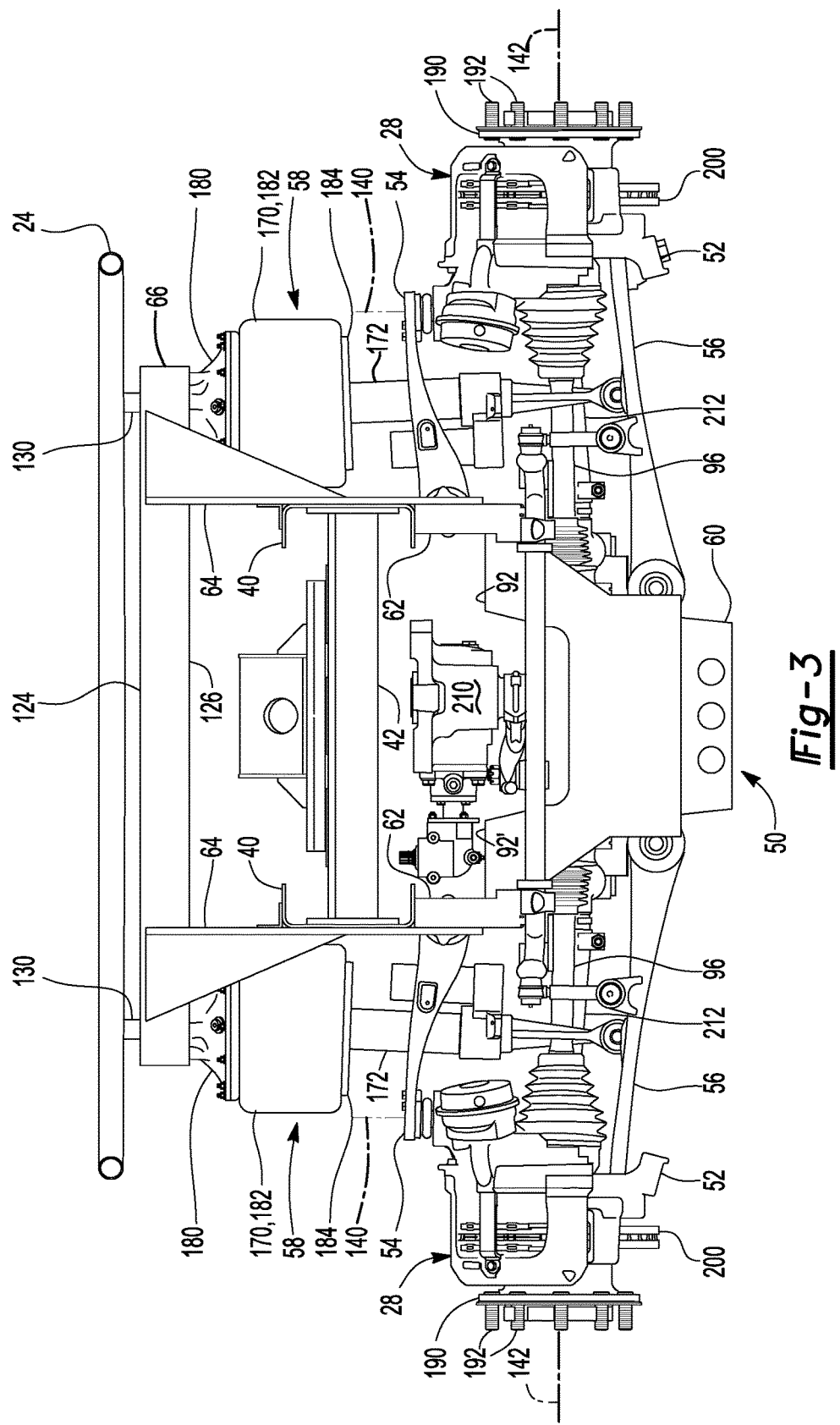
FIG. 3 is a rear side view of FIG. 1.

An upper control arm mounting plate 62 may pivotally support a corresponding upper control arm 54. For example, an upper control arm mounting plate 62 may include a pair of slots 100 that may receive the upper control arm 54. The slots 100 may be open-ended slots that may be open in an upward direction or a direction that faces toward the cross beam 66. A pivot mechanism, such as a pivot pin may be received in each slot 100 and may pivotally couple the upper control arm 54 to the upper control arm mounting plate 62. As is best shown in FIGS. 2 and 3, a frame rail 40 may be disposed on an upper side 102 of each upper control arm mounting plate 62. As such, the frame rail 40 may extend across the open end of each slot 100.

Referring to FIG. 5, one or more side plates 64 may extend from a corresponding upper control arm mounting plate 62 to the cross beam 66. For example, a first side plate 64 may be fixedly disposed on a first upper control arm mounting plate 62 and may extend upwardly to the cross beam 66. A second side plate 64 may be disposed opposite the first side plate 64 and may be fixedly disposed on a second upper control arm mounting plate 62 and may extend upwardly to the cross beam 66. The side plates 64 may be disposed on a lateral outboard side of a corresponding upper control arm mounting plate 62 and may be fixedly coupled to the upper control arm mounting plate 62 in any suitable manner, such as with fasteners like bolts, rivets, and/or dowels, by welding, or combinations thereof. In addition, the frame rails 40 may be disposed on an inboard side of the side plates 64 that may be disposed opposite the outboard side as is best shown in FIG. 2. The side plates 64 may also be disposed substantially parallel to each other. The frame rails 40 may be fixedly coupled to a corresponding side plate 64 in any suitable manner, such as with fasteners like bolts, rivets, and/or dowels, by welding, or combinations thereof. In at least one configuration, the side plates 64 may be substantially planar metal plates. Optionally additional brackets or plates may be mounted to the side plates 64 to support other components, such as the cross beam 66.

Referring to FIG. 5, each side plate 64 may include various openings. For example, each side plate 64 may have one or more upper control arm receiving slots 110 and a cross beam receiving slot 112.

An upper control arm receiving slot 110 may receive the upper control arm 54. In the configuration shown, two upper control arm receiving slots 110 are provided that are spaced apart from each other and are aligned with a corresponding slot 100 on the upper control arm mounting plate 62. The upper control arm receiving slots 110 may be open-ended slots that may be open in a downward direction or a direction that faces toward the skid plate 70.

A cross beam receiving slot 112 may be disposed near or at the top of each side plate 64. The cross beam receiving slot 112 may receive the cross beam 66. A cross beam receiving slot 112 may be longitudinally positioned between the upper control arm receiving slots 110 and may be configured as an open-ended slot that may be open in an upward direction that may toward the cross beam 66.

Referring to FIGS. 2 and 5, the cross beam 66 may be disposed at or near the top of the subframe assembly 50. For instance, the cross beam 66 may be disposed above and may be spaced apart from the frame rails 40 as is best shown in FIG. 2. The cross beam 66 may extend from a first side plate 64 to a second side plate 64. For example, the cross beam 66 may be received in a cross beam receiving slot 112 in each side plate 64. As such, the cross beam 66 may be fixedly attached to the side plates 64 to reinforce the suspension module 22 and inhibit bending stresses on the side plates 64. This in turn may allow the side plates 64 to be provided with a planar or sheet-like configuration which may reduce cost and weight. The cross beam 66 may extend laterally outward past the side plates 64 to facilitate mounting of a corresponding dampener 58 as will be discussed in more detail below.

The cross beam 66 may have a hollow tubular construction. In the configuration shown, the cross beam 66 has a generally rectangular cross-section. The cross beam 66 may define a cross beam passage 120. The cross beam passage 120 may extend through the cross beam 66. One or more reinforcement inserts 122 may be received in the cross beam passage 120. The reinforcement inserts 122 may be positioned between a top side 124 and a bottom side 126 of the cross beam 66. The top side 124 may face toward the cabin frame 24. The bottom side 126 may be disposed opposite the top side 124. In the configuration shown, two reinforcement inserts 122 are provided that are disposed near or at opposite ends of the cross beam 66 and are located directly above a corresponding dampener 58 as is best shown in FIG. 1. As such, the reinforcement inserts 122 may help reinforce the cross beam 66 to better withstand load forces exerted via the dampeners 58 while allowing the cross beam 66 to be provided with a hollow tubular construction to reduce weight.

Referring to FIGS. 2 and 3, the cross beam 66 may facilitate mounting of the cabin frame 24 to the subframe assembly 50. For example, one or more cabin mounting bushings 130 may be disposed on the top side 124 of the cross beam 66 and may extend from the cross beam 66 to the cabin frame 24. In the configuration shown, two cabin mounting bushings 130 are provided. A first cabin mounting bushing 130 may be disposed directly above a first dampener 58. A second cabin mounting bushing 130 may be disposed directly above a second dampener 58. Such a configuration may provide a direct load path from the cabin frame 24 to the dampeners 58 by way of a corresponding cabin mounting bushing 130, the cross beam 66, and a corresponding reinforcement insert 122. The cabin frame 24 may support a cab or cabin of the vehicle 10 that may have a passenger compartment that may receive a driver.

Referring to FIGS. 1-3, the knuckle 52 may interconnect the wheel end assembly 26 to the upper control arm 54 and the lower control arm 56. The knuckle 52 may have a steerable configuration or a non-steerable configuration. A knuckle that has a steerable configuration may rotate about a first axis 140 with respect to the upper control arm 54 and the lower control arm 56 to steer or change the direction of travel of the vehicle 10. A knuckle that has a non-steerable configuration may not rotate about an axis to steer or change the direction of travel of the vehicle 10. In FIGS. 1-3, the knuckle 52 is depicted with a steerable configuration.

The knuckle 52 may facilitate mounting of the wheel end assembly 26 and the brake subsystem 28. For example, the knuckle 52 may have a spindle that may rotatably support the wheel end assembly 26. The spindle may support one or more wheel bearings that rotatably support a hub of the wheel end assembly 26 and allow the hub and an associated wheel to rotate about a second axis 142. In a drive axle configuration, the axle may extend through the spindle and may provide torque to a corresponding hub and wheel. A portion of the brake subsystem 28, such as a brake caliper, may be fixedly mounted to the knuckle 52. The knuckle 52 may be operatively connected to the steering subsystem 30 as will be discussed in more detail below.

Referring to FIGS. 1-4, a pair of upper control arms 54 may extend from opposing lateral sides of the subframe assembly 50 to a corresponding knuckle 52. An upper control arm 54 may be pivotally or rotatably mounted to the subframe assembly 50 in a manner that allows the knuckle 52 and a corresponding wheel end assembly 26 to move up and down while inhibiting forward and backward movement. For example, the upper control arm 54 may have a pair of arms 150 that may extend through a corresponding upper control arm receiving slot 110 in a side plate 64 and may be received in a corresponding slot 100 in an upper control arm mounting plate 62. Each arm 150 may be pivotally coupled to the upper control arm mounting plate 62 with a pivot mechanism. The pivot mechanism may have any suitable configuration. For example, the pivot mechanism may include a pivot pin about which the upper control arm 54 may rotate. The pivot pin may be fixedly coupled to the upper control arm mounting plate 62 in any suitable manner, such as with one or more fasteners like bolts. The upper control arm 54 may also be pivotally coupled to the knuckle 52 with another pivot mechanism that may allow the knuckle 52 to pivot with respect to the upper control arm 54. As is best shown in FIG. 4, the arms 150 may also cooperate to partially define an opening 152 through which the dampener 58 may extend.

Referring to FIGS. 1-4, the lower control arm 56 may be disposed below the upper control arm 54. In the configuration shown, a pair of lower control arms 56 may extend from opposing lateral sides of the subframe assembly 50 to a corresponding knuckle 52. A lower control arm 56 may be pivotally or rotatably mounted to the lower subframe 60 in a manner that allows the knuckle 52 and a corresponding wheel end assembly 26 to move up and down while inhibiting forward and backward movement. For example, the lower control arm 56 may have a pair of arms 160 that may be mounted to different subframe blocks 72, such as a first subframe block 90, 90' and a second subframe block 92, 92'. Each arm 160 may be pivotally coupled to a subframe block with a pivot mechanism. The pivot mechanism may have any suitable configuration. For example, the pivot mechanism may include a pivot pin about which the lower control arm 56 may rotate. The pivot pin may be fixedly coupled to a subframe block in any suitable manner, such as with one or more fasteners like bolts. The lower control arm 56 may also be pivotally coupled to the knuckle 52 with another pivot mechanism that may allow the knuckle 52 to pivot with respect to the lower control arm 56. As is best shown in FIG. 4, the dampener 58 may also be pivotally mounted to the lower control arm 56 between the knuckle 52 and the subframe assembly 50.

Referring to FIGS. 2 and 3, one or more dampeners 58 may be provided to control and dampen movement of the suspension module 22. In the configuration shown, a pair of dampeners 58 is provided. A dampener 58 may have any suitable configuration. For example, a dampener 58 may be configured as an air spring, shock absorber, strut, coil spring, or combinations thereof. In FIGS. 1 and 2, a dampener 58 is shown that includes an air spring 170 and a strut 172 or shock absorber that has a first end and a second end. The first end may be disposed proximate or may be pivotally coupled to the lower control arm 56. The second end may be disposed opposite the first end and may be coupled the cross beam 66.

Referring to FIG. 4, the air spring 170 may be disposed at or near the top of a dampener 58. As such, the air spring 170 may extend between the cross beam 66 and the strut 172. The air spring 170 may have any suitable configuration. For instance, the air spring 170 may have a mounting plate 180, flexible bellows 182, and a piston 184. The mounting plate 180 may be fixedly disposed on the bottom side 126 of the cross beam 66, such as with one or more fasteners. Moreover, the mounting plate 180 and hence the air spring 170 may be disposed directly below a reinforcement insert 122 and/or a cabin mounting bushing 130. The flexible bellows 182 may extend from the mounting plate 180 to the piston 184. The flexible bellows 182 may at least partially define a chamber within the air spring 170 that may receive the piston 184 and pressurized gas that may be provided by a pressurized gas supply system. Pressurized gas may be provided to the chamber or may be vented from the chamber to adjust the ride height and dampening characteristics of the suspension system. The piston 184 may be at least partially received in the flexible bellows 182 and may extend from the strut 172 toward the mounting plate 180. For example, the piston 184 may be fixedly disposed on the strut 172 or fixedly positioned with respect to the strut 172, such as with one or more fasteners, and may be disposed near or at the center of the flexible bellows 182.

The strut 172 may extend from the air spring 170 to or toward the lower control arm 56. For example, the strut 172 may be pivotally mounted to the lower control arm 56 with a pivot mechanism, such as a pivot pin. The strut 172 may act as a damper or shock absorber. The strut 172 may be laterally positioned between the upper control arm 54 and a portion of subframe assembly 50, such as the lower subframe 60, an upper control arm mounting plate 62, and a side plate 64. As is best shown in FIG. 4, the strut 172 may extend through the opening 152 in the upper control arm 54 but may not be coupled to the upper control arm 54.

Referring to FIGS. 2 and 3, the wheel end assembly 26 may facilitate rotation a wheel that may support a tire. The wheel end assembly 26 may be part of a drive axle or a non-drive axle. A drive axle may receive torque from a power source, such as an internal combustion engine or electric motor. In a drive axle configuration, a shaft 96 may transmit torque to the wheel end assembly 26 to rotate a wheel that may be mounted on the wheel end assembly 26. For instance, the shaft 96 may be operatively connected at a first end to a vehicle drivetrain component like a differential, gearbox, or motor and may extend through the knuckle 52 and may be coupled to the wheel end assembly 26 at a second end. The shaft may be omitted in a non-drive axle configuration. In at least one configuration, the wheel end assembly 26 may include a hub 190.

The hub 190 may be rotatably disposed on the spindle of the knuckle 52. For example, one or more wheel bearings may be disposed on the spindle and may rotatably support the hub 190. The hub 190 may facilitate mounting of the wheel, such as with a plurality of mounting studs 192. As such, the hub 190 and the wheel may rotate together about the second axis 142. A tire may be disposed on the wheel that may engage a road or support surface.

Referring to FIGS. 1-3, the brake subsystem 28 may facilitate braking of the wheel to slow rotation of the hub 190 and an associated wheel about the second axis 142 of the wheel end assembly 26. The brake subsystem 28 may have any suitable configuration. For instance, the brake subsystem 28 may be configured as a friction brake, such as a disc brake or a drum brake. In FIGS. 1-3, the brake subsystem 28 is configured as a disc brake. In such a configuration, a brake friction member 200 may be configured as a brake rotor that may be fixedly coupled to the hub 190 such that the brake rotor may rotate with the hub 190. One or more brake pads of the brake subsystem 28 may be actuated into engagement with the brake friction member 200 to slow rotation of the hub 190 and the wheel about the second axis 142.

Referring to FIG. 1, the steering subsystem 30 may steer or change the direction of travel of the vehicle. As is best shown in FIG. 2, the steering subsystem 30 may include a steering gear 210 that may be operatively connected to the knuckles 52 by a linkage arrangement. For example, the linkage arrangement may include a tie rod 212 that may be pivotally connected to a knuckle 52 at a first end and pivotally connected to an intermediate arm 214 at a second end. The intermediate arm 214 may be pivotally mounted on a portion of the lower subframe 60, such as a first subframe block 90, 90'. A relay rod 216 may be pivotally connected to an intermediate arm 214 at each end. The steering gear 210 may be operatively connected to a member of the linkage arrangement, such as to an intermediate arm 214. Thus, the steering gear 201 may actuate or output a force that may be transmitted by the linkage arrangement to rotate the knuckles 52. The steering gear 210 may be disposed on the subframe assembly 50 or may be fixedly positioned with respect to the subframe assembly 50.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension module comprising:
    a subframe assembly that includes:
        a lower subframe that pivotally supports a lower control arm;
        first and second upper control arm mounting plates that pivotally support first and second upper control arms, respectively, wherein the first and second upper control arm mounting plates are mounted to the lower subframe;
        first and second side plates that are mounted to the first and second upper control arm mounting plates, respectively, wherein the first and second side plates each have a pair of upper control arm receiving slots that receive the first and second upper control arms, respectively; and
        a cross beam that extends from the first side plate to the second side plate.

2. The suspension module of claim 1 further comprising a cabin frame that is mounted to the cross beam.

3. A suspension module comprising:
    a subframe assembly that includes:
        a lower subframe that pivotally supports a lower control arm;
        first and second upper control arm mounting plates that pivotally support first and second upper control arms, respectively, wherein the first and second upper control arm mounting plates are mounted to the lower subframe;
        first and second side plates that are mounted to the first and second upper control arm mounting plates, respectively; and
        a cross beam that extends from the first side plate to the second side plate; and
    first and second cabin mounting bushings that extend from the cross beam to a cabin frame that is mounted to the cross beam.

4. The suspension module of claim 3 wherein the first and second cabin mounting bushings extend from a top side of the cross beam and are disposed directly above first and second air springs, respectively.

5. The suspension module of claim 4 wherein the first and second air springs are coupled to a bottom side of the cross beam.

6. The suspension module of claim 4 wherein the first air spring is disposed between the first upper control arm and the first side plate and the second air spring is disposed between the second upper control arm and the second side plate.

7. The suspension module of claim 4 further comprising first and second reinforcement inserts are disposed inside the cross beam and are positioned between the top side and the first and second air springs, respectively.

8. The suspension module of claim 1 wherein first and second frame rails are disposed on an upper side of the first and second upper control arm mounting plates, respectively, and are disposed between the first and second side plates.

9. The suspension module of claim 8 wherein the first and second frame rails are spaced apart from the cross beam.

10. The suspension module of claim 9 wherein the first and second frame rails are fixedly coupled to the first and second side plates, respectively.

11. A suspension module comprising:
    a subframe assembly that includes:
        a lower subframe that pivotally supports a lower control arm;
        first and second upper control arm mounting plates that pivotally support first and second upper control arms, respectively, wherein the first and second upper control arm mounting plates are mounted to the lower subframe;
        first and second side plates that are mounted to the first and second upper control arm mounting plates, respectively; and a cross beam that extends from the first side plate to the second side plate, wherein the first and second side plates each have a cross beam receiving slot that receives the cross beam.

12. The suspension module of claim 1 wherein the first and second upper control arms are received in slots of the first and second upper control arm mounting plates, respectively.

13. The suspension module of claim 1 wherein the first and second side plates are substantially planar and are disposed substantially parallel to each other.

14. A suspension module comprising:
a subframe assembly that includes a lower subframe that pivotally supports a lower control arm, wherein the lower subframe includes:
a skid plate;
a set of subframe blocks that are fixedly mounted to the skid plate and that pivotally support the lower control arm; and
a first upper control arm mounting plate that extends between and connects members of the set of subframe blocks, wherein an upper control arm is pivotally mounted to the first upper control arm mounting plate.

15. The suspension module of claim 14 wherein the set of subframe blocks includes a first subframe block and a second subframe block that extend from the skid plate to the first upper control arm mounting plate.

16. The suspension module of claim 15 wherein the first subframe block is spaced apart from the second subframe block.

17. The suspension module of claim 16 wherein a shaft extends through an opening in the subframe assembly that is located between the first subframe block and the second subframe block and between the skid plate and the first upper control arm mounting plate.

18. The suspension module of claim 15 wherein a steering subsystem is mounted to the first subframe block but not to the second subframe block.

19. The suspension module of claim 18 wherein at least two first subframe blocks that are mirror images of each other are mounted at opposite lateral sides of the skid plate, wherein one first subframe block extends from the skid plate to the first upper control arm mounting plate and another first subframe block extends from the skid plate to a second upper control arm mounting plate.

20. The suspension module of claim 18 wherein at least two second subframe blocks that are mirror images of each other are mounted at opposite lateral sides of the skid plate, wherein one second subframe block extends from the skid plate to the first upper control arm mounting plate and another second subframe block extends from the skid plate to a second upper control arm mounting plate.

* * * * *